July 18, 1950     R. A. SHAW     2,515,269
AUXILIARY SPREADING ATTACHMENT
Filed July 22, 1948     2 Sheets-Sheet 1
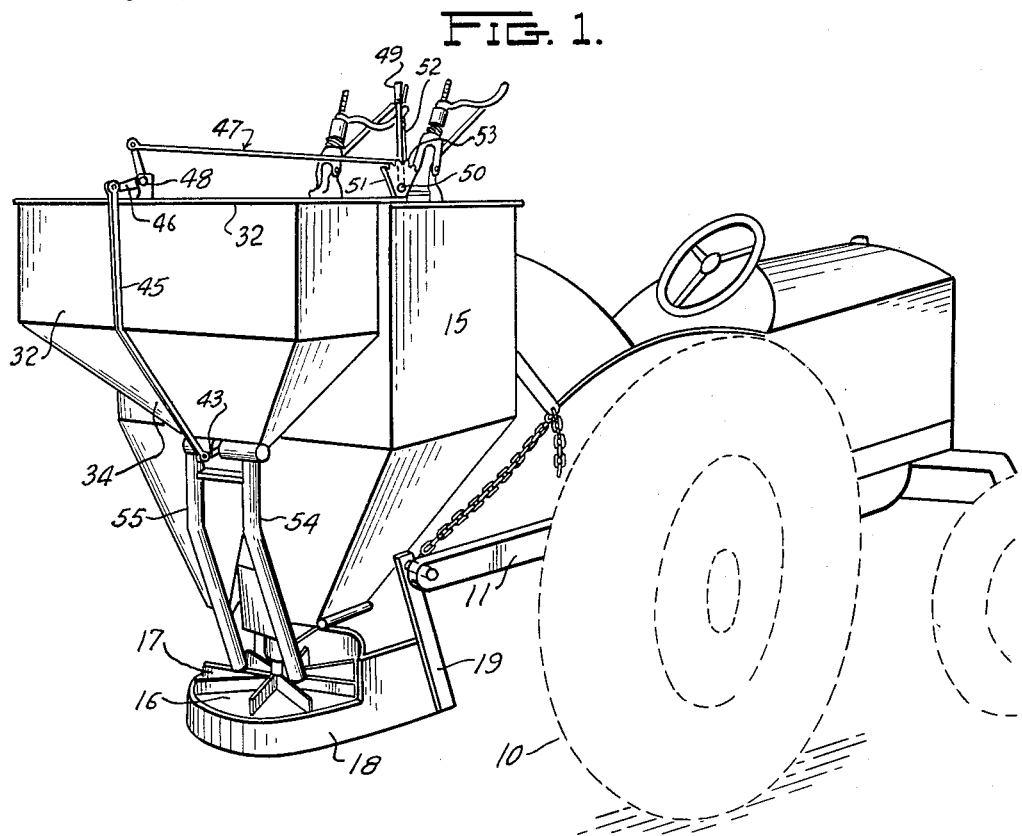
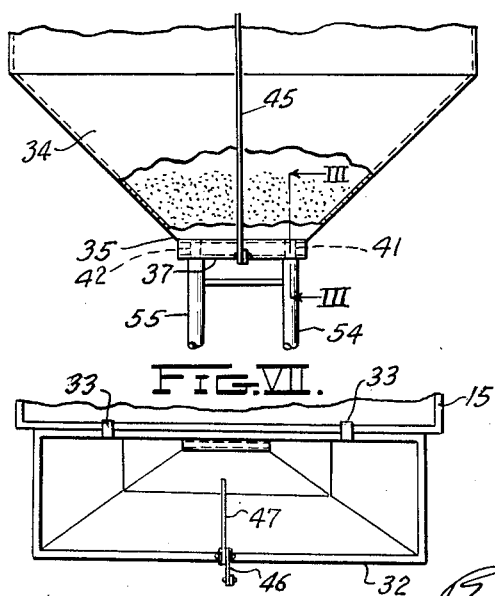
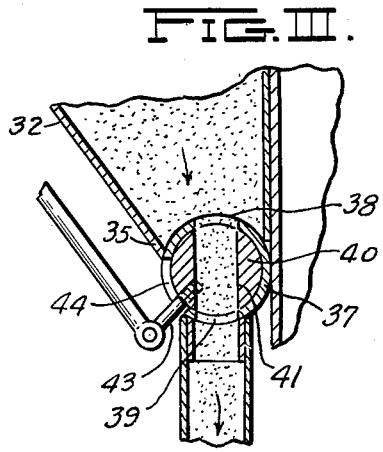
INVENTOR.
Roy A. Shaw
BY
Edmund B Whitcomb
ATTORNEY July 18, 1950 R. A. SHAW 2,515,269
AUXILIARY SPREADING ATTACHMENT
Filed July 22, 1948 2 Sheets-Sheet 2
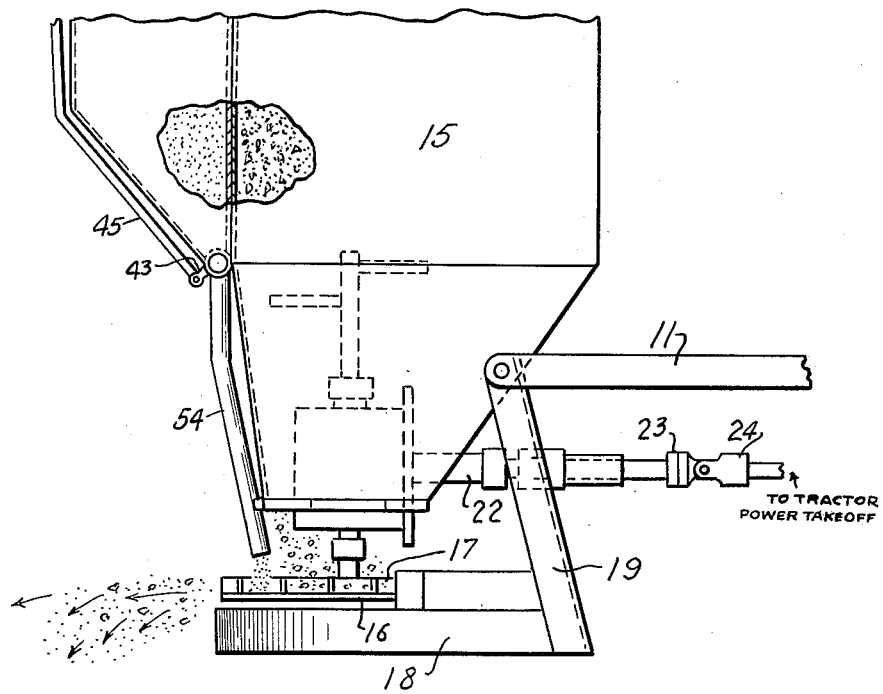
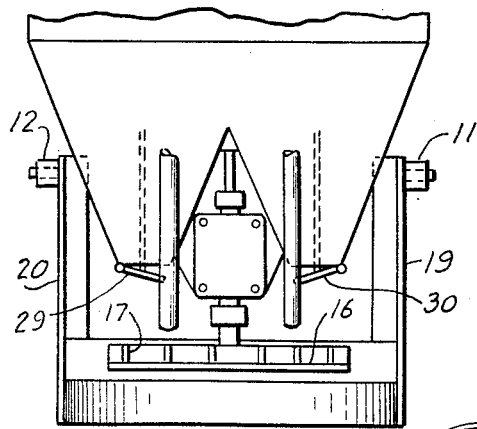
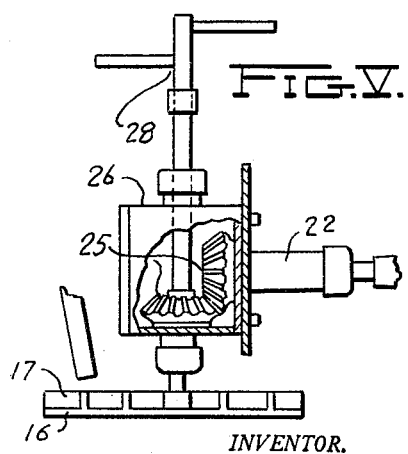
INVENTOR.
Roy A. Shaw
BY Edmund B. Whitcomb
ATTORNEY Patented July 18, 1950

2,515,269

UNITED STATES PATENT OFFICE 2,515,269

AUXILIARY SPREADING ATTACHMENT

Roy A. Shaw, San Bernardino, Calif.

Application July 22, 1948, Serial No. 40,189

2 Claims. (Cl. 275—8)

The present invention relates to a seed distribution attachment to be used with the spreading mechanism shown in my copending application, Serial No. 777,615, filed October 3, 1947. In the present invention, I provide a hopper for seed of various kinds to be attached directly to the rear face of the hopper of the fertilizer or seed spreader shown in my copending application utilizing the spinner mechanism of the spreader for also distributing the seeds of various kinds from the auxiliary seeder attachment hopper. This arrangement makes it possible to perform two spreader operations at the same time, as for example, spreading alfalfa seed from the attachment unit and spreading oats or other grain from the large standard hopper and spreader mechanism, shown in my copending application. The arrangement also makes it possible to spread both fertilizer and seed at the same time, as in the case of sowing grass seed.

More specifically, the attachment consists of a hopper attached to the rear face of the main hopper of the main spreader, the auxiliary hopper having a pair of discharge chutes and a simplified easily operated cut off control with link mechanism extending at the top and toward the front of the main hopper so that all the controls may be readily actuated from the driver's seat. The discharge chutes or pipes from the auxiliary hopper terminate one on the right hand and one on the left hand side of the spinner plate, and this arrangement permits a very even distribution of the seed.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I shows a perspective view of my improved attachment coupled with the hopper distributor of my copending application and spinner mechanism shown attached to a tractor;

Figure II is an elevation of the attached hopper shown in Figure I, the lower portion thereof being shown in section;

Figure III is a vertical cross sectional view taken on the line III—III of Figure II;

Figure IV is a side elevational view of the lower portion of the hopper and discharge mechanism shown in Figure I;

Figure V is a detailed view, partly in section, showing the driving mechanism and location of the discharge chutes from the auxiliary hopper;

Figure VI is an enlarged elevational detailed view of the main hopper and the discharge tube from the auxiliary hopper adjacent the spinner distributor mechanism.

Figure VII is a top plan view of the auxiliary hopper showing the attaching means to the main hopper.

Referring to the drawings, I have illustrated diagrammatically a tractor 10, having a pair of rearwardly extending braces or supports 11 and 12, one on each side to which the main distributing hopper and discharge mechanism 15 having the spinner plate 16 with the vanes 17 supporting stand 18 and inclined braces 19 and 20, which attach the device to said supports 11 and 12, as indicated. The main distributor mechanism includes, as shown in my copending application, a drive shaft 22 coupled by a pair of universal joints 23 and 24 to the tractor power take off, as indicated in the extreme right of Figure IV; and at the other end said drive shaft connects with suitable gearing 25 within the gear box 26 for operating the spinner 16 below the hopper 15, the gear box also carrying an upwardly directed stirring or agitating mechanism 28, as shown in Figure V. As shown in Figure VI, the gear box and drive is located between the twin discharge outlets 29 and 30 of the main hopper.

My auxiliary attachment includes, as shown in Figure I, a separate hopper 32 which has at its upper edge a pair of spaced overhanging hooks 33, said hooks fitting over the upper edge of the main hopper 15. In this way, the auxiliary hopper 32 is readily attached and detached from the main distributing mechanism.

The auxiliary container or hopper 32 terminates in a pyramidal lower portion 34 so that any seed deposited in the hopper 32 naturally converges toward an outlet portion 35, indicated in Figure II. To suitably control the rate of flow of the material out of the hopper 32, I provide a rotary control mechanism in the form of a transverse pipe 37 having a pair of top openings 38 and a pair of lower openings 39 located adjacent the extreme ends of the discharge opening 35 of the hopper 32.

Within the pipe 37 is a rotary cut off 40 in the form of a solid cylindrical piece having transverse bores 41 and 42 adapted to connect the openings 38 with the openings 39 on opposite sides of the transverse pipe 37, when the cut-off 40 has been rotated to a position such as that shown in Figure III.

The cut-off 40 has affixed thereto a lever arm 43, said arm being adapted to move in a slot 44 provided in the pipe 37. See Figures I and III.

I have provided a control mechanism for the cut-off 40, in a connecting rod 45, which is pivotally attached to the lever arm 43, rod 45 being connected to a bell crank 46 pivoted at 48 on the upper edge of hopper 32. From the bell crank 46, a rod 47 connects same with a hand lever 49, which lever is pivoted as at 50 on a quadrant 51, the quadrant being attached to the upper edge of the hopper 15 of the spreading mechanism.

A latch mechanism 52 mounted on lever 49 is adapted to engage teeth 53 on the quadrant 51, this being for the purpose of holding lever 49 in various positions and thus, through its connections with the cut-off 40, to adjustably control the flow of seeds through openings 41 and 42.

A pair of discharge chutes 54 and 55 are mounted in alignment with openings 39 in transverse pipe 37 and are so constructed that their lower ends will discharge material on opposite sides of the center of the spinner plate 16 of the spreading mechanism to evenly distribute the material on the ground. It should be noted that I have located the control lever 49 within easy reach of the operator and adjacent the controls provided for the spreading mechanism.

In operation, the auxiliary seed distributing attachment 32 is placed in position by hooking it over the edge of the main hopper 15 of the spreading mechanism, where it is supported by hooks 33, as shown in Figure VII and is held in position by gravity. When desired, the attachment 32 can be readily removed.

Seed is then placed in the hopper 32, the cut-off 40 of the rotary control mechanism being so adjusted that the passage of seed therethrough is shut off. Other kinds of seeds or fertilizer may then be placed in the main spreader hopper 15, and the machine is ready to operate.

When the tractor is started and the area is reached where the seeding operation is desired, the discharge ports of the spreading mechanism are opened by the operator, thus allowing the material to fall on the surface of the rapidly rotating spinner 16.

Simultaneously, the operator adjusts the hand lever 49 so as to open the passages of the rotary control mechanism, and allow seed to fall from the auxiliary seed hopper 32, through the discharge chutes 54 and 55 onto the surface of the spinner on opposite sides of the center thereof where it mixes with the other seed or fertilizer and is thrown out by the vanes on the spinner and very evenly distributed.

When viewing the mechanisms described from the rear, spinner or spreader turns anti-clockwise. Material deposited by right hand chute 54 is carried by spinner and expelled from front left hand side of spinner. Material deposited by left hand chute 55 is expelled from rear right hand side of spinner. Variations in the amount of seed falling upon the spinner are secured by adjusting "operating lever" so that the cut-off 40 is rotated to restrict the openings 38 and 39 in the valve casing, and thus to regulate the amount of seed falling from the hopper 32.

As pointed out previously, seeds of various kinds may be substituted for the fertilizer in the spreading mechanism, and thus two seeding operations may be performed simultaneously. This auxiliary attachment 32 makes it possible to perform two spreader operations at one time, as in spreading alfalfa and oats or grains, using alfalfa in the smaller unit, oats or grain in the larger unit. It also makes it possible to spread fertilizer at the same time as grass seed. Controls are easily reached from seat of the tractor.

It is apparent that within the scope of this invention, modifications and different arrangements may be made other than is herein disclosed, and the present disclosure is illustrative merely, the invention comprehending all variations thereof.

What I claim is:

1. In a seed distributing attachment to be used with a spreading mechanism having a main hopper and a power driven spinner plate, an auxiliary hopper; supports therefor adapted to engage the main hopper of the spreading mechanism; a double ported valve located at the bottom of said auxiliary hopper, for regulating the flow of material therefrom; a rotary plug for said valve having spaced openings therethrough in alignment with the ports of the said double ported valve, a connecting linkage adapted to rotate said plug, and a hand lever associated with said linkage and operable to regulate the flow of material from the auxiliary hopper onto the spinner plate of the spreading mechanism.

2. In a seed distributing attachment to be used with a spreading mechanism having a main hopper and a power driven spinner plate, an auxiliary hopper; supports therefor adapted to engage the main hopper of the spreading mechanism; a rotary valve located at the bottom of the auxiliary hopper, having a tubular valve casing; a pair of spaced ports in said casing, located at the ends thereof, the upper pair being in communication with the interior of the auxiliary hopper, a rotary valve plug having spaced transverse openings through said plug movable into alignment with the openings in the valve casing; and a pair of chutes in connection with the lower ports of said valve casing and adapted to discharge material from the auxiliary hopper onto the spinner plate when the valve is open.

ROY A. SHAW.

REFERENCES CITED

The following references are of record in the file of this patent:

UNITED STATES PATENTS

| Number | Name | Date |
|---|---|---|
| 1,630,555 | Witt | May 31, 1927 |
| 2,303,876 | Gaddis | Dec. 1, 1942 |

FOREIGN PATENTS

| Number | Country | Date |
|---|---|---|
| 23,225 | Great Britain | Oct. 11, 1912 |
| 491,912 | Germany | Feb. 19, 1930 |